E. G. HOOPS, DEC'D.
J. W. HOOPS, ADMINISTRATOR.
INDICATOR.
APPLICATION FILED APR. 12, 1916.
1,321,441.
Patented Nov. 11, 1919.
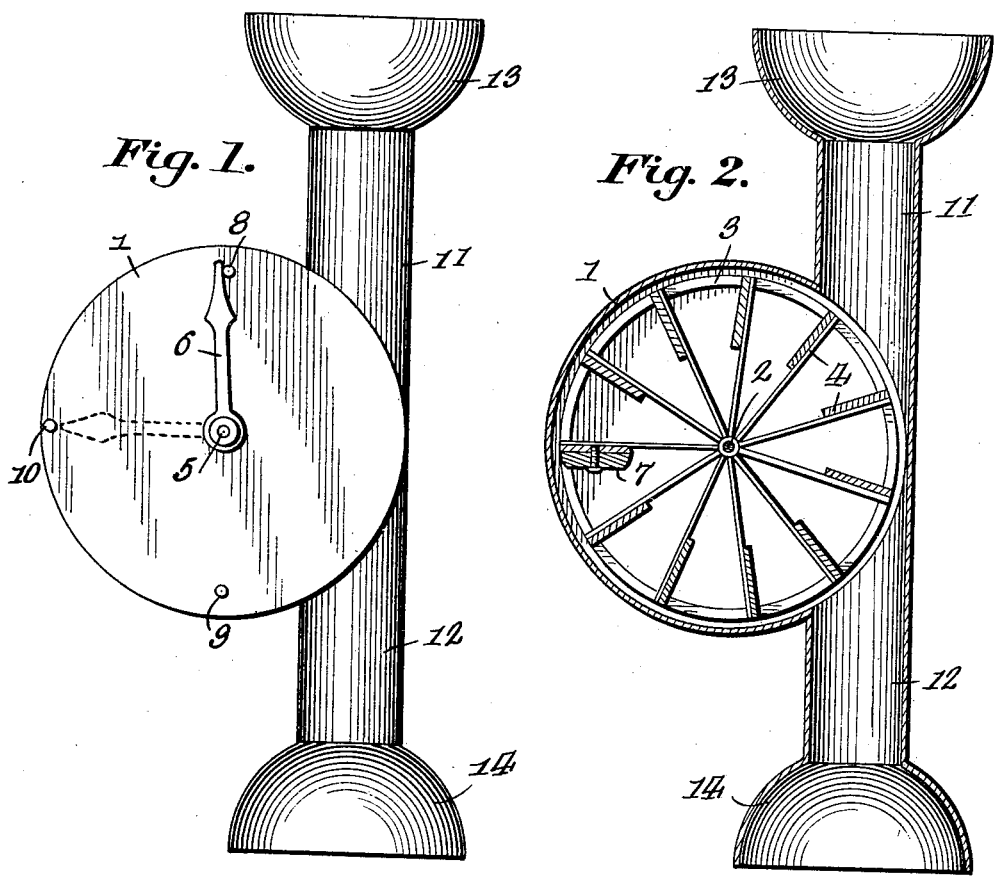
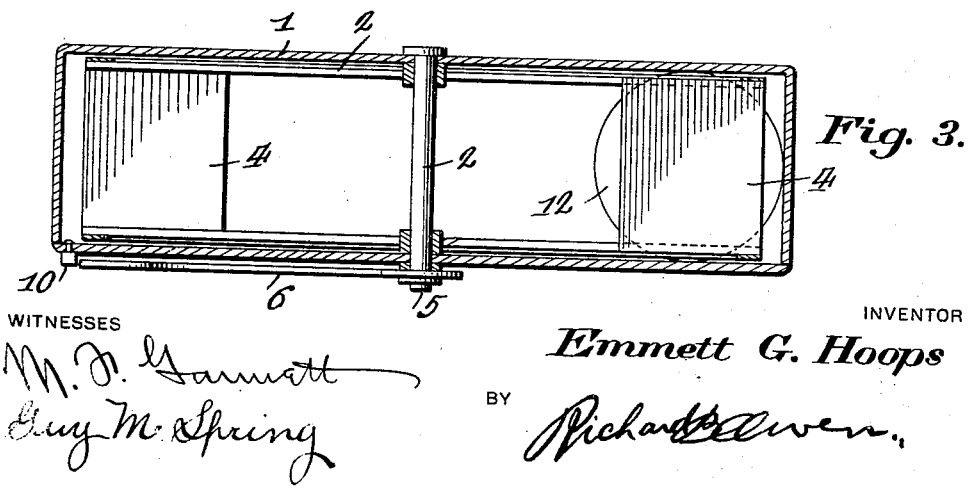
WITNESSES
INVENTOR
Emmett G. Hoops
BY
ATTORNEY

UNITED STATES PATENT OFFICE.

EMMETT G. HOOPS, OF TACOMA, WASHINGTON; J. W. HOOPS ADMINISTRATOR OF SAID EMMETT G. HOOPS, DECEASED.

INDICATOR.

1,321,441.   Specification of Letters Patent.   Patented Nov. 11, 1919.

Application filed April 12, 1916. Serial No. 90,678.

*To all whom it may concern:*

Be it known that I, EMMETT G. HOOPS, a citizen of the United States, residing at Tacoma, in the county of Pierce and State of Washington, have invented certain new and useful Improvements in Indicators, of which the following is a specification.

My invention relates to an indicator, and more particularly to an indicator adapted for use in connection with aeroplanes, dirigibles, or the like, and has for its object to provide a device which will automatically indicate the ascent or descent of an aeroplane, or the like, whereby the aviator may be positive that his machine is answering to its controls, without depending upon his sense of feeling, and which will automatically indicate the ascent or descent of the machine when the same is caused by accident or through the failure of some part of the machine.

Another object is the provision of a weighted wheel revolubly mounted in a cylindrical casing and having a pointer secured to the spindle thereof upon the outside of the casing adapted to revolve with the fan wheel, said pointer by reason of the weighted wheel adapted to normally assume a neutral horizontal position, the said casing being further provided with tubular members communicating with the interior of the casing and extending in either direction in alined relation, whereby when the machine rises and falls air pressure through the tubes will actuate the fan wheel and move the pointer to indicate the vertical direction in which the machine is moving.

With these and other objects in view this invention consists in the construction and combination of the various parts as will be hereinafter more particularly described and pointed out in the appended claims.

In the drawings:

Figure 1 is a view in elevation of my device showing the pointer in the position which it will assume when the machine is ascending.

Fig. 2 is a vertical section of the same.

Fig 3 is a section upon the line 3—3 of Fig. 1 showing the pointer in its normal neutral position.

The numeral 1 indicates a cylindrical casing in which is revolubly mounted, by means of the spindle 2, a wheel 3 provided with paddles or blades 4. An end 5 of the spindle 2 projects upon the outside of the casing and has mounted thereon, so as to revolve with the wheel 3, a pointer 6 which is held in normal horizontal position, as shown by the dotted lines in Fig. 1, by means of the weight 7 secured to one of the blades 4, the weight being clearly illustrated in Fig. 2. Studs 8 and 9 are disposed at the top and bottom respectively of the casing upon the outside thereof and serve as stops for the pointer 6 whereby the same is caused to indicate the vertical direction in which the machine is moving. A similar stud 10 serves to indicate the normal neutral position of the pointer 6.

Mounted upon the periphery of the casing 1 and communicating with the interior thereof are tubular members 11 and 12 which extend in opposite directions and are provided at the outer ends with spouts or funnels 13 and 14 the purpose of which will be hereinafter described. It will also be noted that the said tubular members 11 and 12 are extended in alined relation with each other for a reason which will presently appear.

In use, my device is secured to the aeroplane, by suitable fastening means, so as to be in plain sight of the aviator at all times whereby he may note the manner in which his machine answers to his control when ascending or descending. In ascending or descending it is apparent that the air pressure will be counter to the direction in which the machine is moving, so that when the machine is ascending the funnel like member 13 will catch the air which will be directed downwardly through the tubes 11 and 12 exerting pressure upon the blades 4 of the wheel 3, thereby causing the same to revolve in a direction counter to the air pressure until the pointer 6 engages the stud 8, thereby indicating that the machine is ascending. When the machine is descending the funnel like member 14 will catch the air and pressure will be directed upwardly through the tubes 11 and 12, actuating the wheel 3 until the pointer 6 engages the stud 9 which will indicate that the machine is descending. When the machine is traveling in a direction parallel to the surface of the earth the pointer will, by reason of the weight 7, point to the neutral stud 11.

While, it will be seen from the description taken in connection with the drawings, that I have provided a device which is clearly operable and efficient for the purpose described, I do not claim the exact construction as shown, but reserve the right to make certain minor changes and alterations as will not depart from the spirit and scope of the appended claims.

I claim:

1. An aeroplane indicator comprising a straight tubular member positioned in a vertical plane, a casing provided upon one side of said member intermediate its ends, an indicating wheel rotatably mounted in said casing, said wheel having blades the resistant ends of which are adapted to extend into said tubular member intermediate its ends for the purpose set forth.

2. An aeroplane indicator comprising a tubular vertical pipe arranged in a vertical plane, a circular casing secured thereto intermediate its ends, a spindle mounted in said casing and having one end extending beyond the circular face of said casing, an indicating wheel mounted in the casing upon said spindle, said wheel including a plurality of paddles having their resistance ends extending into the vertical tube intermediate its ends, a weight secured to one of said paddles for normally holding the wheel in a predetermined position, a pointer secured to the extended end of said spindle at right angles to the weighted paddle, studs arranged upon the circular face of said casing at the top and bottom thereof for abutment with the pointer, a stud secured adjacent the edge of said circular plate equi-distant from said first named studs and arranged beyond the sweep of the pointer to indicate the normal position of the wheel.

In testimony whereof I affix my signature in presence of two witnesses.

EMMETT G. HOOPS.

Witnesses:
J. A. HOWARD,
GEO. JOHNSON.

Copies of this patent may be obtained for five cents each, by addressing the "Commissioner of Patents, Washington, D. C."